United States Patent
Caronna et al.

(10) Patent No.: US 11,124,442 B2
(45) Date of Patent: Sep. 21, 2021

(54) METHOD FOR MANUFACTURING SILICON DIOXIDE PREFORMS EMPLOYED IN THE PRODUCTION OF OPTICAL FIBERS

(71) Applicant: PRYSMIAN S.p.A., Milan (IT)

(72) Inventors: Valeria Caronna, Battipaglia (IT); Stefano Grieco, Battipaglia (IT); Antonio Schiaffo, Battipaglia (IT); Tonino Caruso, Fisciano (IT)

(73) Assignee: PRYSMIAN S.p.A., Milan (IT)

(*) Notice: Subject to any disclaimer, the term of this patent is extended or adjusted under 35 U.S.C. 154(b) by 223 days.

(21) Appl. No.: 16/317,237

(22) PCT Filed: Jul. 18, 2016

(86) PCT No.: PCT/EP2016/067057
§ 371 (c)(1),
(2) Date: Jan. 11, 2019

(87) PCT Pub. No.: WO2018/014934
PCT Pub. Date: Jan. 25, 2018

(65) Prior Publication Data
US 2019/0315649 A1    Oct. 17, 2019

(51) Int. Cl.
C03B 37/012    (2006.01)
C07F 7/10    (2006.01)

(52) U.S. Cl.
CPC ......... *C03B 37/01205* (2013.01); *C07F 7/10* (2013.01)

(58) Field of Classification Search
None
See application file for complete search history.

(56) References Cited

U.S. PATENT DOCUMENTS 2,389,802 A * 11/1945 McGregor ............. C08L 83/04
556/401
5,043,002 A    8/1991 Dobbins et al.
(Continued)

FOREIGN PATENT DOCUMENTS

DE    10 2011 121 356 A1    6/2013
WO    WO 98/15499 A1    4/1998
WO    WO 2013/092553 A1    6/2013

OTHER PUBLICATIONS

WO-2013092553 translation, Trommer, Martin, Method for Producing Synthetic Quartz Glass, Jun. 27, 2013. (Year: 2013).*

(Continued)

*Primary Examiner* — Queenie S Dehghan
(74) *Attorney, Agent, or Firm* — Oblon, McClelland, Maier & Neustadt, L.L.P.

(57) ABSTRACT

The present invention relates to a method for manufacturing a preform of silica for optical fiber production, as well as to a method for the production of optical fibers comprising a step of drawing the optical fiber from such a preform of silica, the method comprising a step of vaporization of a siloxane feedstock added with a compound having the following formula (I): wherein R, R' and R", equal or different each other, are an alkyl group having from 1 to 5 carbon atoms, and A is a saturated or unsaturated chain of atoms selected from the group consisting of carbon atom, nitrogen atom, and oxygen atom, said chain A forming with the nitrogen atom linked thereto a saturated, unsaturated or aromatic heterocyclic moiety.

(Continued)

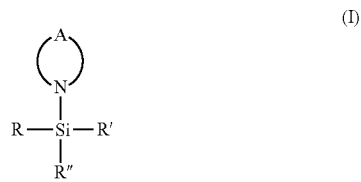

(I)

14 Claims, 1 Drawing Sheet

(56) References Cited

U.S. PATENT DOCUMENTS

| 5,879,649 A | 3/1999 | Henderson et al. |
| 6,191,286 B1 | 2/2001 | Gunther et al. |
| 6,770,572 B1 * | 8/2004 | Wu .................. H01L 21/02216 438/778 |
| RE39,535 E | 4/2007 | Dobbins et al. |

OTHER PUBLICATIONS

International Search Report dated Apr. 4, 2017 in PCT/EP2016/067057 filed on Jul. 18, 2016.

* cited by examiner

METHOD FOR MANUFACTURING SILICON DIOXIDE PREFORMS EMPLOYED IN THE PRODUCTION OF OPTICAL FIBERS

FIELD OF THE INVENTION

The present invention generally relates to a method for the production of optical fibers.

In particular, the present invention relates to a method for manufacturing preforms of silicon dioxide ($SiO_2$, usually known as silica) employed in the production of optical fibers.

BACKGROUND OF THE INVENTION

Optical fibers presently on the market are mainly manufactured by drawing the fiber from a cylindrical preform of silica.

Preforms of silica can be obtained by chemical vapor deposition (CVD) methods starting from a suitable liquid feedstock which is vaporized and then ejected through nozzles in a reaction chamber where the feedstock is converted into silica particles which adhere on the external surface of a rotating bar (outside deposition method) or on the inner surface of a rotating tube or pipe (inner deposition method). Processes of this type are often known as OVD (outside vapor phase deposition), MCVD (modified chemical vapor deposition), PCVD (plasma chemical vapor deposition), PECVD (plasma enhanced chemical vapor deposition), VAD (vapor phase axial deposition).

Silicon tetrachloride ($SiCl_4$) has been used as the main silicon containing liquid feedstock to be converted into silica for the manufacturing of optical fibers. The disadvantage of using $SiCl_4$ is the production of HCl as a byproduct, which requires a significant and expensive abatement plant.

As an alternative to using $SiCl_4$ as a feedstock, silica may be formed from halide-free, silicon-containing feedstocks such as siloxanes.

U.S. Pat. No. 5,043,002 discloses the benefits of using polyalkylsiloxanes such as polymethylsiloxanes, and in particular polymethylcyclosiloxanes with octamethylcyclotetrasiloxane (OMCTS, also named D4) as the preferred silicon-containing feedstock, in the formation of silica. D4 is a cyclic molecule having the following chemical formula:

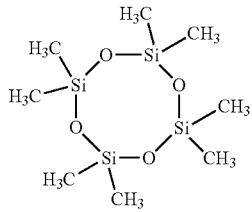

Siloxanes like OMCTS are liquid at room temperature and generally comprise impurities deriving from the production process thereof. The impurities can be cyclic molecules comprising 3 or 5 silicon atoms (known as D3 and D5) or linear molecules (known as $L_n$) having the following formula:

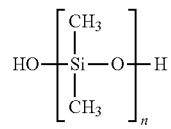

wherein n is an integer from 2 to 13.

The linear molecule ends have two hydroxyl groups. The functional group with the connectivity Si—O—H is called silandiol and is highly polar and reactive at high temperature (about 250° C.).

The use of such cyclic siloxanes, and in particular octamethyl-cyclotetrasiloxane (OMCTS or D4), in the manufacture of silica can pose problems caused by the tendency of the linear siloxane impurities to polymerize when exposed to elevated temperatures. See, for example, U.S. Pat. No. 5,879,649.

Polymerized siloxane species having high molecular weight normally have boiling points exceeding the vaporizing and delivery temperatures of the silica manufacturing process and are thus deposited during vaporizing and delivery in the line carrying the vaporous reactants to the burner or within the burner itself in form of gel deposits which can obstruct the burner nozzles and required production stops for cleaning.

Also, particulates of the high molecular weight polymerized siloxanes may be deposited on the optical fiber blank, resulting in "defect" or "clustered defect" imperfections that adversely affect the quality of the subsequently drawn fiber and can require scrapping of an entire blank.

U.S. Pat. No. 5,879,649 discloses a method of purifying by distillation a polyalkylsiloxane composition, having a boiling point, under atmospheric conditions, of less than about 250° C.

WO98/015499 discloses a method of inhibiting gelling of siloxane feedstocks by end-capping technique. By using such a technique, the polymerizable ends of the siloxane compound are preferentially reacted with a compound which prevents the polymerization by covalently blocking such polymerizable ends. The preferred end capping compound is told to be triethyl borate. A silica forming feedstock comprised of siloxane and 0.5 wt % to 12 wt % triethyl borate is preferred to result in a silica glass with minimal boron content while inhibiting gel formation.

WO2013/092553 relates to a method for producing synthetic quartz glass such that the evaporation of the feedstock takes place in the presence of a volatile passivation reagent which reduces the polymerisation tendency of the polymerisable polyalkylsiloxane compound. Amines can have a passivating action by reacting functional groups of the polyalkysiloxane compound. The basic structure of these compounds is: N[R, R', R"], where R, R', R" stands for the same or different residues selected from alkyl, aryl or silyl groups. Alkyl groups consist of saturated hydrocarbon compounds. An aryl group consists of an aromatic hydrocarbon basic structure in which a ring hydrogen atom is replaced by a different monovalent group. Hexamethyldisilazane (HMDS, also known as bis(trimethylsilyl)amine) is particularly preferred.

The Applicant noted that siloxane feedstocks, such as octamethyl-cyclotetrasiloxane (OMCTS) feedstock, due to their high hygroscopicity, usually comprise water in an amount ranging from 20 to 150 ppm, and sometimes even higher.

Although the water as such does not cause any problem in the manufacture of the preform, the Applicant has observed that silazane derivatives, and in particular hexamethyldisilazane (HMDS), are more reactive with water than with the aforementioned siloxane impurities. As a result, a portion of HMDS added to a siloxane feedstock reacts with water instead of passivating the silandiol groups. When HMDS is used for passivating the siloxane feedstock, the amount of HMDS would be calculated on the basis of the feedstock water content, which is to be determined from time to time for each supply batch. Also, the siloxane feedstock should be stored in controlled humidity and temperature conditions to avoid an unpredictable change of the water content, which would imply carrying out another water content check just before use.

SUMMARY OF THE INVENTION

The Applicant faced the problem of overcoming this drawback, and has surprisingly found that trialkylsilane derivatives comprising a heterocyclic moiety are able to prevent the above phenomenon of polymerization in the siloxane feedstock showing a lower side-reactivity with water.

Accordingly, in a first aspect, the present invention relates to a method for manufacturing a preform of silica for optical fiber production, the method comprising a step of vaporization of a siloxane feedstock added with a compound having the following formula (I):

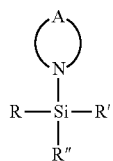

wherein R, R' and R", equal or different each other, are an alkyl group having from 1 to 5 carbon atoms, and A is a saturated or unsaturated chain of atoms selected from the group consisting of carbon atom, nitrogen atom, and oxygen atom, said chain A forming with the nitrogen atom linked thereto a saturated, unsaturated or aromatic heterocyclic moiety.

In a second aspect, the present invention relates to a method for the production of optical fibers comprising a step of drawing the optical fiber from a preform of silica, wherein said preform of silica is obtained from a siloxane feedstock added with a compound having the following formula (I):

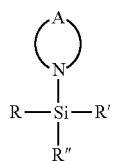

wherein R, R' and R", equal or different each other, are a linear or branched alkyl group having from 1 to 5 carbon atoms, and A is a saturated or unsaturated chain of atoms selected from the group consisting of carbon atom, nitrogen atom, and oxygen atom, said chain A forming with the nitrogen atom linked thereto a saturated, unsaturated or aromatic heterocyclic moiety.

In a third aspect, the present invention relates to a compound for use in manufacturing a preform of silica, said compound having the following formula (I):

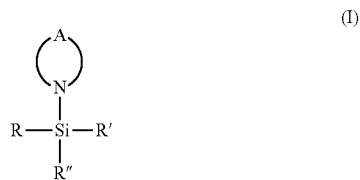

wherein R, R' and R", equal or different each other, are an alkyl group having from 1 to 5 carbon atoms, and A is a saturated or unsaturated chain of atoms selected from the group consisting of carbon atom, nitrogen atom, and oxygen atom, said chain A forming with the nitrogen atom linked thereto a saturated, unsaturated or aromatic heterocyclic moiety.

In one embodiment of the invention, A is a saturated or unsaturated chain of carbon atoms. In another embodiment, A is a saturated or unsaturated chain of carbon atoms and one or more nitrogen atoms. In a further embodiment, A is a saturated or unsaturated chain of carbon atoms and one or more oxygen atoms. In another further embodiment, A is a saturated or unsaturated chain of carbon atoms, one or more nitrogen atoms, and one or more oxygen atoms.

In a preferred embodiment of the present invention, A is a saturated or unsaturated chain of carbon atoms, a saturated or unsaturated chain of carbon atoms and one nitrogen atom; or a saturated or unsaturated chain of carbon atoms and one oxygen atom.

When A is a saturated or unsaturated chain of carbon atoms and one or more nitrogen atoms, a —Si(R)(R')(R") group can be present as substituent on a nitrogen atom.

Optionally, one or more carbon atoms of chain A is substituted by an oxo group (=O).

Preferably, chain A forms with the nitrogen atom linked thereto a saturated, unsaturated or aromatic heterocyclic moiety having from 3 to 7 atoms, more preferably from 4 to 7 atoms, and most preferably from 5 to 6 atoms.

Preferably, chain A forms with the nitrogen atom linked thereto an aromatic heterocyclic moiety. It has been found that after the passivation, an aromatic residue of the compound of formula (I) is more reactive in the combustion process.

Useful examples of saturated, unsaturated or aromatic heterocyclic moieties formed by A with the nitrogen atom of the compound of formula (I) are azetidine, pyrrolidine, pyrroline, 3-pyrroline, 2-pyrrolydone, pyrrole, oxazolidine, isoxazolidine, 2-oxazolidinone, 4-oxazolidinone, 5-oxazolidinone, pyrazolidine, pyrazole, 2-pyrazoline, imidazole, 2-imidazoline, imidazolidine, piperidine, 4-piperidone, pyridine, 1,2,3,6-tetrahydro-pyridine, 1,4-dihydro-pyridine, 4-pyridone, morpholine, 3-morpholinone, piperazine, dihydro-pyrazine, 1H-azepine, hexamethyleneimine.

More preferably, the heterocyclic moieties formed by A with the nitrogen atom of the compound of formula (I) is imidazole, pyrazole, piperidine, piperazine, oxazolidine, 2-oxazolidinone, and morpholine.

Most preferably, the heterocyclic moieties formed by A with the nitrogen atom of the compound of formula (I) is imidazole, 2-oxazolidinone, and morpholine.

R, R' and R", equal or different each other, are a linear or branched alkyl chain comprising from 1 to 5 carbon atoms, such as for example methyl, ethyl, propyl, isopropyl, n-butyl, isobutyl, sec-butyl, tert-butyl, pentyl, isopentyl, sec-pentyl, tert-pentyl, neo-pentyl, and 3-pentyl.

Preferably, R, R' and R", equal or different each other, are a linear or branched alkyl chain comprising from 1 to 4 carbon atoms, such as for example methyl, ethyl, propyl, isopropyl, n-butyl, isobutyl, sec-butyl, tert-butyl.

More preferably, R, R' and R", equal or different each other, are a linear or branched alkyl chain comprising from 1 to 3 carbon atoms, such as for example methyl, ethyl, propyl, isopropyl.

Advantageously, R, R' and R", equal or different each other, are methyl or ethyl.

Useful examples of compounds of formula (I) useful in the present invention are 1-(trimethylsilyl)-imidazole (TMSI), 1-(triethylsilyl)-imidazole, 1-(ethyldimethylsilyl)-imidazole, 1-(diethylmethylsilyl)-imidazole, 1-(t-butyldimethylsilyl)-imidazole (TBDMSIM), 1-(trimethylsilyl)-pyrazole, 1-(trimethylsilyl)-piperidine, 1-(trimethylsilyl)-piperazine, N-(tri-methylsilyl)-oxazolidine, 3-(trimethylsilyl)-2-oxazolidinone (TMSO), and N-(trimethylsilyl)-morpholine.

More preferably, the compounds of formula (I) useful in the present invention are 3-(trimethylsilyl)-2-oxazolidinone (TMSO), 1-(t-butyl-dimethylsilyl)-imidazole (TBDMSIM) and N-(trimethylsilyl)-morpholine are preferred.

The siloxane feedstock employed in the method of the present invention is known in the art. Preferred siloxane feedstocks are those described, for example, in U.S. Pat. No. 5,043,002, in particular polyalkylsiloxanes, such as polymethylsiloxanes, and polyalkylcyclo-siloxanes, such as polymethylcyclosiloxanes.

Useful examples of siloxane feedstock employed in the method of the present invention are hexamethylcyclotrisiloxane (HMCTS), octamethylcyclotetrasiloxane (OMCTS) and decamethylcyclopenta-siloxane (DMCPS), where OMCTS has been found to be the most preferred.

In the method of the present invention, the siloxane feedstock is added with an amount of the above described compound of formula (I) lower than 5 vol %, preferably lower than 3 vol %, and more preferably lower than 1 vol % with respect to the total volume of siloxane feedstock.

In the method of the present invention, the siloxane feedstock is added with an amount of the above described compound of formula (I) of at least 0.001 vol %, preferably of at least 0.01 vol %, and more preferably of at least 0.05 vol % with respect to the total volume of siloxane feedstock.

Advantageously, in the method of the present invention, the siloxane feedstock is added with an amount of the above described compound of formula (I) ranging from 0.05 vol % to 1 vol %, and most preferably from 0.05 vol % to 0.5 vol % with respect to the total volume of siloxane feedstock.

Optionally, the siloxane feedstock containing a compound of formula (I) comprises a further silylating agent, such as N,O-bis(trimethylsilyl)-acetamide (BSA), N,O-bis(trimethylsilyl)trifluoroacetamide (BSTFA), N-methyl-N-(trimethylsilyl)trifluoroacetamide (MSTFA), preferably in a vol % equal to or lower than that of the compound of formula (I). For example, the further silylating agent is in a vol % down to the third of that of the compound of formula (I).

The presence of a silylation catalyst, such as trymethylchlorosilane (TMCS) can increase the reactivity of the siloxane feedstock containing a compound of formula (I) optionally added a with further silylating agent.

The compound of formula (I) is added to the siloxane feedstock at least one hour, preferably at least three hours, and more preferably more than fifty hours before using (vaporizing) the siloxane feedstock in the method of the present invention. The Applicant noted that the longer the period of time between the addition and the vaporizing step, the lower the formation of polymerized siloxane species having high molecular weight.

BRIEF DESCRIPTION OF THE FIGURES

The present invention will be better understood by reading the following detailed description, given by way of example and not of limitation, to be read with the accompanying drawings, wherein.

DETAILED DESCRIPTION OF THE INVENTION

Figure 1:
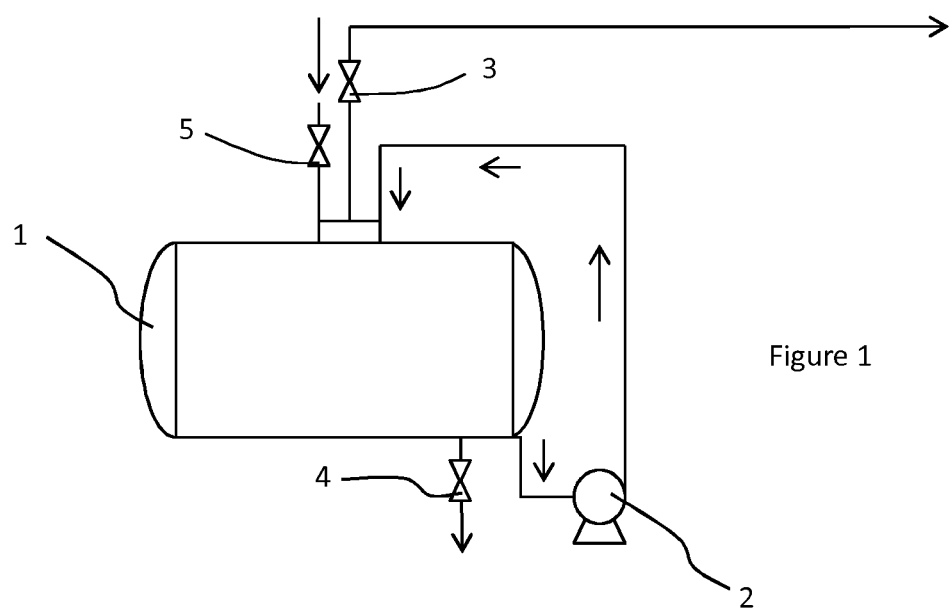
FIG. 1 shows a schematic view of the apparatus containing the feedstock of the invention for processing

The present invention relates to a method for manufacturing a preform of silica, comprising a step of vaporization of a siloxane feedstock, as well as to a method for the production of optical fibers comprising a step of drawing the optical fiber from such a preform of silica, wherein said siloxane feedstock comprises a compound having the above described formula (I).

Most of the processes being developed by industry today for the manufacture of optical waveguides employ the chemical vapor deposition (CVD) concept or a modified version thereof. The precursor vapors are entrained by a carrier gas stream and then passed through a burner flame, usually a natural gas/oxygen mixture and frequently containing excess oxygen. The vapors in the mixture are converted to their respective oxides upon exiting the burner orifice to form a stream of volatile gases and finely-divided, amorphous, spherical aggregates, called soot. The soot is collected on a mandrel or in a pipe, where it is deposited in thin layers in radial or axial direction. The final product of soot collection, the porous preform, is then subjected to a temperature at which the preform consolidates to a nonporous monolithic glassy body.

In usual practice, the process for manufacturing optical fibers is a three-stage process.

The first stage involves oxidizing reactant feedstock(s) to form finely-divided, amorphous spherical particles of soot on a substrate. In the second stage of the process, the blank or preform is subsequently heat treated in inert atmosphere to full consolidation. In the third and final stage, conventional fiber-draw technology is utilized in extracting optical fiber from the preform.

The first stage of this process can be carried out in a number of different ways, by depositing layers of specially formulated silicon dioxide on the surface of a substrate. The layers are deposited by applying a gaseous stream of pure oxygen added with siloxane feedstocks to the substrate. As the oxygen contacts the hot surface silicon dioxide of high purity is formed.

In a first embodiment of the first stage, reactant is supplied in liquid form to a flow distributor that delivers the liquid to one end of a vaporization device. The liquid flows down a heated, inclined surface as a thin film toward a second end of the device. When the second end is reached, liquid has been converted to a vapor and is delivered to a burner for oxidation to soot particles.

A second embodiment of the first stage also involves use of a vaporizer. Here, the vaporizer is a heated, vertically-extending expansion chamber which achieves vaporization when reactant is sprayed onto heated interior walls of the vaporizer.

In a third embodiment of the first stage, liquid reactant is delivered to a flash vaporization chamber. In that chamber, the liquid assumes the form of a thin film, vaporizes, and mixes with a gas selected from the group consisting of an inert gas, a combustible gas, an oxidizing gas, and mixtures thereof for delivery to an oxidation burner.

Figure 2:
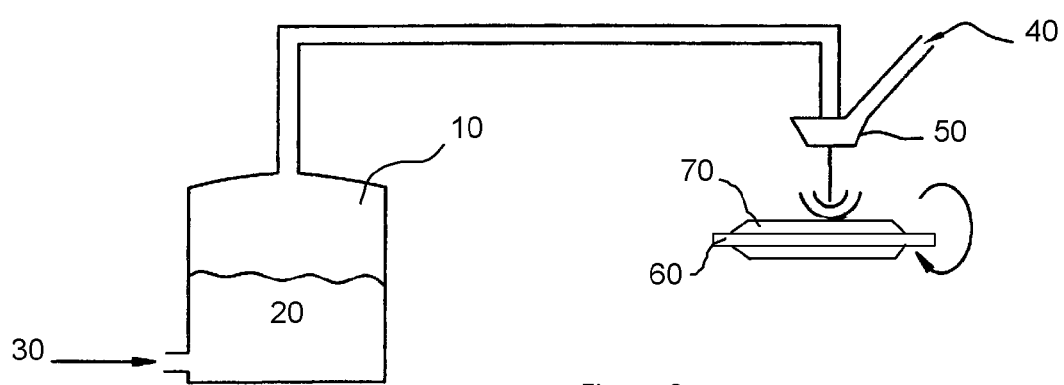
FIG. 2 shows a schematic representation of an apparatus and process for depositing silica soot on a rotating mandrel to form a porous blank or preform.

As depicted in FIG. 2, a siloxane feedstock 20 comprising the compound having the above described formula (I) according to the present invention is provided in a container 10. The feedstock 20 is pressurized in the container 10 by an inert gas 30. The pressurized feedstock 20 is vaporized at a temperature of 200°–250° C. The resulting vapors of the siloxane feedstock 20 are entrained in the carrier gas 30 and transported to the burner 50 fed with a burner flame fuel 40 (for example a methane/oxygen mixture), whereby combustion and oxidation are induced at the burner 50. The resulting soot is deposited on a rotating mandrel 60 thus forming a preform or blank 70 of silica soot.

The following examples are intended to further illustrate the present invention, without however restricting it in any way.

Example 1

Fluid D4 (octamethylcyclotetrasiloxane) has been used for the production of silica soot. The feedstock was maintained in a tank as shown in FIG. 1.

The fluid D4 in the tank 1 was constantly mixed through a recirculating pump 2.

Through spilling valve 4, a small amount of D4 was sampled for chemical analysis (the hydroxy end-terminated siloxanes were analyzed by using a gas chromatography after pre-concentration by solid phase extraction; the extracted was reacted with bis(trimethyl-silyl)-trifluoroacetamide BSTFA). After standing for 20 minutes at room temperature, the sample was injected into the gas chromatograph. The gas chromatograph used was a GC-MSD Agilent 7890A system.

Through feeding valve 5, compound addition was carried out.

During the preform manufacturing process, the feedstock was fed to the burner (50 in FIG. 2) opening the line above the container line (10).

Different batches of D4 were used containing hydroxy end-terminated linear siloxane impurities $L_n$ as shown in Table 1 (the amounts being expressed as ppm).

As reported, the linear siloxane impurities $L_n$ content of the batches A and B was mainly due to L2 up to L6 linear molecules. This silandiol concentration is known to be too high, resulting in troublesome gel formation.

Different batches were added with a passivating agent according to the invention, i.e. a compound of formula (I), in particular trimethylsilyl-imidazole (TMSI), optionally in the presence of another passivating agent (N,O-bis(trimethylsilyl)-acetamide, BSA) and a silylation catalyst (trymethylchlorosilane, TMCS), or according to the prior art, in particular a silazane derivative, hexamethyldisilazane (HMDS). The passivating agents were added to D4 batches and the resulting mixtures were stirred for different reaction times.

The results are summarized in the following Table 1.

TABLE 1

| Sample | Reaction time | L2 | L3 | L4 | L5 | L6 | L7 | L8 to L13 | Total |
|---|---|---|---|---|---|---|---|---|---|
| 1. Batch A | — | 28.2 | 15.3 | 6.8 | 0.3 | 0.2 | <0.1 | n.d. | 50.8 |
| 1a. Batch A + HMDS (0.005 vol %) | 48 hours | 8.8 | 6.4 | 5.5 | 0.1 | <0.1 | n.d. | n.d. | 20.8 |
| 1b. Batch A + HMDS (0.01 vol %) | 72 hours | 1.2 | 0.6 | 0.1 | <0.1 | <0.1 | n.d. | n.d. | 1.9 |
| 1c. Batch A + TMSI + BSA + TMCS 3:2:3 (0.005 vol % of TMSI) | 2 hours | 0.1 | 0.1 | <0.1 | <0.1 | n.d. | n.d. | n.d. | 0.2 |
| Batch B | — | 3.3 | 11.1 | 1.9 | 0.1 | <0.1 | <0.1 | n.d. | 16.4 |
| Batch B + TMSI (0.1 vol %) | 3 hours | 0.3 | 0.8 | 0.1 | <0.1 | n.d. | n.d. | n.d. | 1.2 |
| Batch B + TMSI (0.1 vol %) | 60 hours | 0.1 | 0.1 | <0.1 | n.d. | n.d. | n.d. | n.d. | 0.2 | n.d.: not detectable

TMSI (a compound of formula (I) according to the invention), optionally in the presence of another passivating agent (N,O-bis(trimethylsilyl)-acetamide, BSA) and a silylation catalyst, showed to effectively reduce the amount of linear siloxane impurities at concentration and time suitable for the industrial application.

HMDS (a silazane derivative) had an appreciable effect in reducing the amount of linear siloxane impurities, but it takes a substantially long time because it first reacts with the water present in D4. It should be taken in account that HMDS has two silylating groups and, accordingly, a double passivation capacity with the respect to a compound of formula (I).

The invention claimed is:

1. A method for manufacturing a preform of silica for optical fiber production, the method comprising:
   vaporization of a siloxane feedstock containing a compound of formula (I):

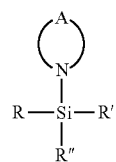

wherein R, R' and R" are each independently an alkyl group having from 1 to 5 carbon atoms, and A is a saturated or unsaturated chain of atoms selected from the group consisting of carbon atom, nitrogen atom, and oxygen atom, wherein said chain A and the nitrogen atom linked thereto is a saturated, unsaturated or aromatic heterocyclic moiety.

2. The method according to claim 1, wherein A is a saturated or unsaturated chain of carbon atoms and one or more nitrogen atoms.

3. The method according to claim 2, wherein said one or more nitrogen atoms of the A chain is substituted with a —Si(R)(R')(R") group wherein R, R' and R" are each independently an alkyl group having from 1 to 5 carbon atoms.

4. The method according to claim 1, wherein A is a saturated or unsaturated chain of carbon atoms and one or more oxygen atoms.

5. The method according to claim 1, wherein chain A and the nitrogen atom linked thereto is an aromatic heterocyclic moiety.

6. The method according to claim 1, wherein R, R' and R" are each independently a linear or branched alkyl chain comprising from 1 to 3 carbon atoms.

7. The method according to claim 1, wherein the compound of formula (I) is selected from the group consisting of 1-(timethylsilyl)-imidazole (TMSI), 1-(triethylsilyl)-imidazole, 1-(ethyldimethylsilyl)-imidazole, 1-(dietylmethylsilyl)-imidazole, 1-(t-butyldimethylsilyl)-imidazole (TBDMSIM), 1-(trimethylsilyl)-pyrazole, 1-(trimethylsilyl)-piperidine, 1-(trimethylsilyl)-piperazine, N-(trimethylsilyl)-oxazolidine, 3-(trimethylsilyl)-2-oxazolidinone (TMSO), and N-(trimethylsilyl)-morpholine.

8. The method according to claim 1, wherein the siloxane feedstock comprises at least one siloxane selected from the group consisting of hexamethylcyclotrisiloxane (HMCTS), octamethyl-cyclotetrasiloxane (OMCTS) and decamethyl-cyclopenta-siloxane (DMCPS).

9. The method according to claim 1, wherein the compound of formula (I) is present in an amount of at least 0.001 vol % with respect to the total volume of siloxane feedstock.

10. The method according to claim 1, further comprising:
adding the compound of formula (I) to the siloxane feedstock at least one hour before the vaporization of the siloxane feedstock.

11. The method according to claim 1, wherein the siloxane feedstock further comprises a silylating agent different from the compound of formula (I).

12. The method according to claim 11, wherein the silylating agent different from the compound of formula (I) is selected from the group consisting of N,O-bis(trimethylsilyl)-acetamide (BSA), N,O-bis(trimethylsily)trifluoroacetamide (BSTFA), and N-methyl-N-(trimethylsilyl)trifluoroacetamide (MSTFA).

13. The method according to claim 11, wherein the silylating agent different from the compound of formula (I) is present in a vol % equal to or lower than the vol % of the compound of formula (I).

14. A method for the production of optical fibers comprising:
drawing the optical fiber from a preform of silica, wherein said preform of silica is obtained from a siloxane feedstock comprising a compound of formula (I):

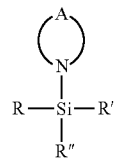

wherein R, R' and R" are each independently a linear or branched alkyl group having from 1 to 5 carbon atoms, and A is a saturated or unsaturated chain of atoms selected from the group consisting of carbon atom, nitrogen atom, and oxygen atom, wherein said chain A and the nitrogen atom linked thereto is a saturated, unsaturated or aromatic heterocyclic moiety.

* * * * *